Dec. 22, 1942.    J. BOGOPOLSKY    2,305,664
AUTOMATIC FADING DEVICE
Filed July 13, 1939
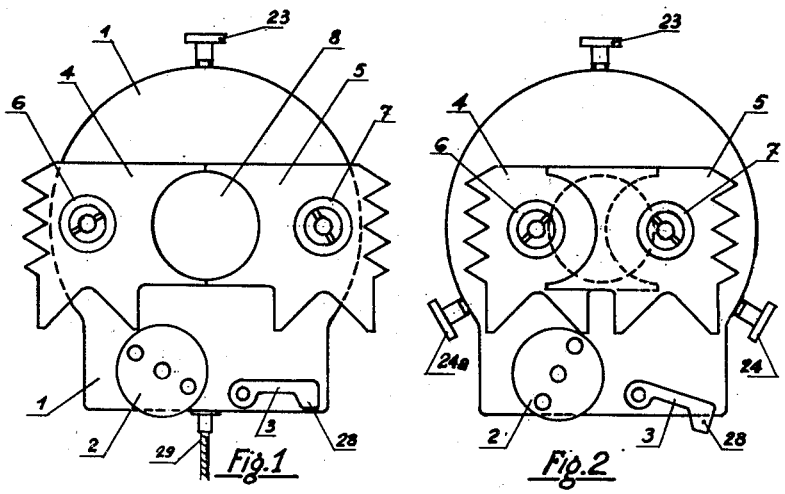
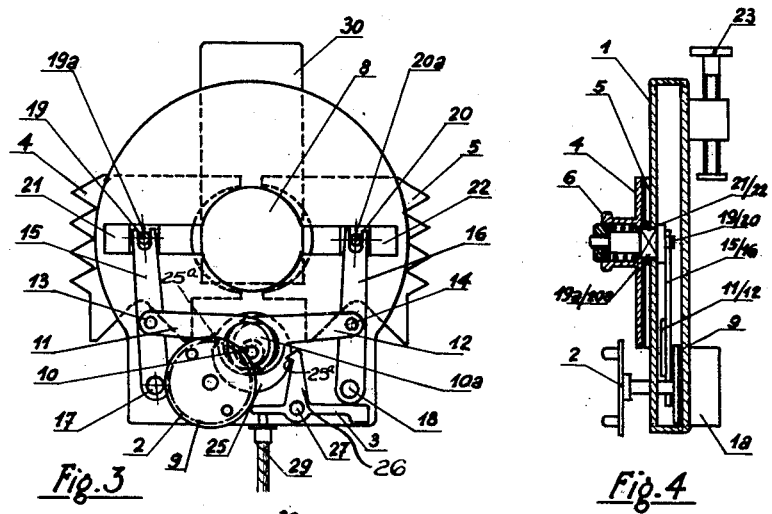
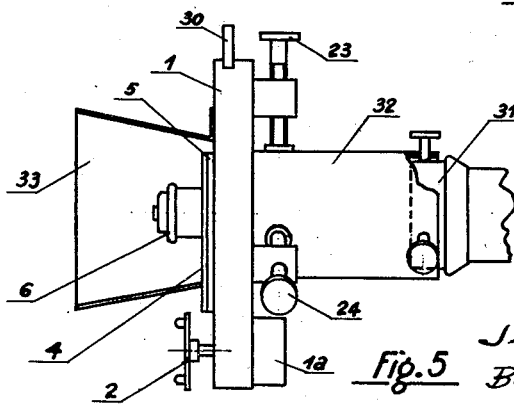
INVENTOR
J. BOGOPOLSKY Patented Dec. 22, 1942

2,305,664

UNITED STATES PATENT OFFICE 2,305,664

AUTOMATIC FADING DEVICE

Jacques Bogopolsky, now by judicial change of name Jacques Bolsey, Geneva, Switzerland Application July 13, 1939, Serial No. 284,345
In Switzerland July 21, 1938

10 Claims. (Cl. 88—16)

In cinematography various methods are employed for causing a view to disappear gradually or to cause it to appear. One of these consists in shutting off the luminous beam, either by means of a diaphragm or vignette arranged in front of, in or behind the lens or by a supplementary shutter and progressively increasing the shutter sector until the beam of light has been intercepted completely. This latter device is generally contained in an apparatus and is frequently actuated automatically by its mechanism. It is called "the automatic fader." Only very expensive apparatus are provided therewth. Additional devices such as vignettes and diaphragms may be mounted on any apparatus, but are inconvenient as they have to be actuated by hand, whereby the operation is complicated, the apparatus is shaken and irregularities occur. The regularity and accuracy of the period of obturating and opening are very important, especially in the case of faders known as "lap-dissolves," that is to say that when a view disappears it is replaced gradually by a new view. All these inconveniences are eliminated by the apparatus described hereinafter.

The subject of the present invention is a device which can be secured to cinematographic apparatus, more especially on the lens, or between this latter and the film, permitting of effecting fading-in, fading-out, lap dissolves, and so forth, of any suitable form, characterized in that it constitutes an accessory secured on or in the apparatus and provided with its own driving mechanism which actuates the shutter elements which operate the fades.

A form of construction in accordance with the present invention is shown by way of example in the accompanying drawing, wherein:

Fig. 1 is a front view of the apparatus, the leaves being open.

Fig. 2 is a similar view of the apparatus, the leaves being closed.

Fig. 3 shows the internal mechanism of the apparatus.

Fig. 4 is an axial section of Fig. 3.

Fig. 5 shows the apparatus provided with an extension tube and a sun-shade.

The apparatus is provided with a casing 1, Fig. 1, containing the mechanism and a clockwork movement. The mechanism having been wound by means of the disc 2, the lever 3 is lowered and then the opaque members or leaves 4 and 5, carried by movable knobs 6 and 7, are set in operation and progressively close the opening 8 located in front of the lens, for effecting a fading-out.

The apparatus is shown in this position in Fig. 2.

When the lever 3 is again pressed, that is to say at the moment of taking a second shot, the leaves again open progressively and resume the position shown in Fig. 1 (fading-in).

The screws 23, 24 and 24a serve to secure the apparatus to the lens of the camera.

In Figs. 3 and 4 there is shown the mechanism of the apparatus, consisting of a barrel 9 which is braked during the unwinding movement of its spring by a gear train and is terminated by an anchor or a fly-wheel enclosed in the mounting 1a. With the flange of the barrel 9 there gears a driving shaft 10 on which are keyed two eccentric cams 10a respectively actuating two levers 11 and 12. For this purpose the ends of these levers 11 and 12 are made annular and the cams are rotating within these annular ends. These levers drive by pivots 13 and 14 two further levers 15 and 16 pivoted respectively at 17 and 18 and of which the opposite end is provided with a slot engaged by the freely mounted shafts 19 and 20. These latter are provided with a square portion 19a, 20a, sliding in grooves 21 and 22 provided in the front wall of the apparatus.

To the square portion of the shafts 19 and 20 are secured the two shutter elements 4 and 5.

It is essential that after each half a revolution (opening or closing) the shaft 10 stops. For this purpose there is mounted thereon a disc 25 provided with two notches 25a with which there engages successively a pawl 26 subjected to the action of a spring (not shown); the pawl 26 is pivotally mounted at 27 and actuated by the lever 3.

The periods of closing and opening may be adjusted by acting on the clockwork movement by any known means, but are generally adjusted in such a manner as to allow about 3–4 seconds for each operation.

The knobs 6 and 7 are keyed to their respective leaves 4 and 5. When it is desired to modify the shape of the obturation it suffices to raise slightly each knob with its leaf, whereby the base of the knob is withdrawn from the square portion 19a or 20a, and then to turn the same on its pivot in order to bring two other edges opposite the opening 8. Each leaf is provided with four edges which are all cut-out differently so as to permit of four different obturations or more, by the combination between them.

It is also possible to remove the two leaves shown by unscrewing the ends of the knobs 6 and 7 and to replace them by other leaves or devices for enabling the operation of fading-in and -out to be effected, for example in the form of an iris diaphragm or the like, the operation being always effected by one of the two shafts 19 and 20 or both at the same time. For ascertaining the exact moment of starting of the clockwork and its stopping, a visible signal is given by an extension 28 of the lever 3, which is painted red for example and appears outside the casing at the beginning and disappears at the end of the operation.

Release of the mechanism may also be effected by a Bowden wire 29 (or other flexible cable) Fig. 1, acting on the pawl 26.

The apparatus is provided at the top (Fig. 5) with an opening so as to enable it to be provided with a supplemental light controlling means 30 such as filter, vignette, diffuser or the like.

Normally the apparatus is placed against the tube of the objective, as a result of which the overlapping edges or profiles of the shutter leaves are designed more or less sharply, according to the diaphragm used. For obtaining a sharp image of these edges it is sufficient to interpose between the objective 31 and the apparatus 1, an extension tube 32 (Fig. 5).

On the other hand for preventing any parasite lighting entering the lens, the apparatus may be provided with a sun-shade 33 which can be dismounted or not and arranged in such a manner as to permit of the free passage of the shutter leaves.

I claim:

1. A fading device for motion picture apparatus comprising a casing, a clockwork motor mounted in said casing, a crankshaft rotatably mounted in said casing, gearing between said crankshaft and said clockwork motor, a pair of eccentrics mounted on said crankshaft, a pair of levers operatively associated at one end one with each of said eccentrics, a pair of levers pivotally mounted in said casing, said first mentioned levers being pivotally connected at their other end to a point intermediate the ends of the second mentioned levers, two supports slidably mounted in said casing, and a pair of shutter plates mounted one on each of said supports, said supports being engaged by the free ends of the second mentioned levers.

2. A device according to claim 1, including radial fastening means, an extension sleeve secured to one side of said casing by these fastening means, and a shade secured to the other side of said casing.

3. A device according to claim 1, including a disc mounted on said crankshaft, said disc having diammetrically oppositely located notches therein, a pawl pivotally mounted in said casing, said pawl being adapted to cooperate with said notches normally to arrest movement of the crankshaft, and means for urging said pawl toward said disc.

4. A device according to claim 1, including a disc mounted on said crankshaft, said disc having diammetrically oppositely located notches therein, and a pawl pivotally mounted in said casing, said pawl being adapted to cooperate with said notches normally to arrest movement of the crankshaft, and means for actuating said pawl including a Bowden wire.

5. A fading-in and fading-out attachment for cameras comprising a support having an opening therein, mounting means for securing said support on the lens tube of a camera with the opening in axial alignment with said tube, a pair of reciprocable members slidably mounted on said support at opposite sides of said opening for movement toward and from the same, a pair of shutter members each mounted on one of said reciprocable sliding members, a spring motor for moving said sliding members toward and from each other, a mechanism for transmitting the motion impulses from said motor to said reciprocable sliding members, means for keeping the speed of movement of said motion transmitting mechanism constant, hand-operated means for starting operation of said motion transmitting mechanism, and means for automatically stopping the operation of said motion transmitting mechanism after the same has moved said sliding members toward or from said lens tube during a certain constant period of time determined by said means for keeping the speed of said motion transmitting mechanism constant.

6. A fading-in and fading-out attachment for cameras comprising a support having an opening therein, mounting means for securing said support on the lens tube of a camera with the opening in axial alignment with said tube, a pair of reciprocable members slidably mounted on said support at opposite sides of said opening for movement toward and from the same, a pair of shutter members each mounted on one of said reciprocable sliding members, each of said shutter members having a series of different contour portions and being turnable about its axis whereby a selected contour portion may be turned into a position facing said lens tube, means for fixing said shutter members in the required relative position to said lens tube and releasing the same for the turning movement, a spring motor for moving said sliding members toward and from each other, a mechanism for transmitting the motion impulses from said motor to said reciprocable sliding members, means for keeping the speed of movement of said motion transmitting mechanism constant, hand-operated means for starting operation of said motion transmitting mechanism, and means for automatically stopping the operation of said motion transmitting mechanism after the same has moved said sliding members toward or from said lens tube during a certain constant period of time determined by said means for keeping the speed of said motion transmitting mechanism constant.

7. A fading-in and fading-out attachment for cameras comprising a support having an opening therein, mounting means for securing said support on the lens tube of a camera with the opening in axial alignment with said tube, a pair of reciprocable members slidably mounted on said support at opposite sides of said opening for movement toward and from the same, a pair of shutter members each mounted on one of said reciprocable sliding members, a spring motor for moving said sliding members toward and from each other, a mechanism for transmitting the motion impulses from said motor to said reciprocable sliding members, means for adjusting the speed of movement of said motion transmitting mechanism regulating thereby the duration of the fading-in and fading-out periods, means for keeping the speed of movement of said motion transmitting mechanism—as determined by said adjusting means—constant, thereby keeping also the duration of the fading-in and fading-out periods as adjusted by said adjusting means permanently constant, hand-operated means for starting operation of said motion transmitting mechanism, and means for automatically stopping the operation of said motion transmitting mechanism after the same has moved said sliding members toward or from said lens tube during a certain constant period of time determined by said means for adjusting the speed of movement of said motion transmitting mechanism.

8. A fading-in and fading-out attachment for cameras comprising a support having an opening therein, mounting means for securing said support on the lens tube of a camera with the opening in axial alignment with said tube, a pair of reciprocable members slidably mounted on said support at opposite sides of said opening for movement toward and from the same, a pair of shutter members each mounted on one of said reciprocable sliding members, each of said shutter members having a series of different contour portions and being turnable about its axis whereby a selected contour portion may be turned into a position facing said lens tube, means for fixing said shutter members in the required relative position to said lens tube and releasing the same for the turning movement, a spring motor for moving said sliding members toward and from each other, a mechanism for transmitting the motion impulses from said motor to said reciprocable sliding members, means for adjusting the speed of movement of said motion transmitting mechanism regulating thereby the duration of the fading-in and fading-out periods, means for keeping the speed of movement of said motion transmitting mechanism—as determined by said adjusting means—constant, thereby keeping also the duration of the fading-in and fading-out periods as adjusted by said adjusting means permanently constant, hand-operated means for starting operation of said motion transmitting mechanism, and means for automatically stopping the operation of said motion transmitting mechanism after the same has moved said sliding members toward or from said lens tube during a certain constant period of time determined by said means for adjusting the speed of movement of said motion transmitting mechanism.

9. A fading-in and fading-out attachment for cameras comprising a support having an opening therein, mounting means for securing said support on the lens tube of a camera with the opening in axial alignment with said tube, a reciprocable member slidably mounted on said support at one side of said opening for movement toward and from the same, an opaque shutter member mounted on said reciprocable sliding member, a spring motor for moving said sliding member toward and from said opening, a mechanism for transmitting the motion impulses from said motor to said reciprocable sliding member, means for keeping the speed of movement of said motion transmitting mechanism constant, hand-operated means for starting operation of said motion transmitting mechanism, and means for automatically stopping the operation of said motion transmitting mechanism after the same has moved said sliding member a certain predetermined distance toward or from said lens tube during a certain constant period of time determined by said means for keeping the speed of said motion transmitting mechanism constant.

10. A fading-in and fading-out attachment for cameras comprising a support having an opening therein, mounting means for securing said support on the lens tube of a camera with the opening in axial alignment with said tube, a reciprocable member slidably mounted on said support at one side of said opening for movement toward and from the same, an opaque shutter member mounted on said reciprocable sliding member, said shutter member having a series of different contour portions and being turnable about its axis whereby a selected contour portion may be turned into a position facing said lens tube, means for fixing said shutter member in required relative position to said lens tube and releasing the same for turning movements, a spring motor for moving said sliding member toward and from said opening, a mechanism for transmitting the motion impulses from said motor to said reciprocable sliding member, means for keeping the speed of movement of said motion transmitting mechanism constant, hand-operated means for starting operation of said motion transmitting mechanism, and means for automatically stopping the operation of said motion transmitting mechanism after the same has moved said sliding member a certain predetermined distance toward or from said lens tube during a certain constant period of time determined by said means for keeping the speed of said motion transmitting mechanism constant.

JACQUES BOGOPOLSKY.